United States Patent

[11] 3,634,748

[72] Inventor Bernhard Siegfried Rudert
210 Fair Mead, Rudd Road, Illovo, Johannesburg, Transvaal, Republic of South Africa

[21] Appl. No. 43,051
[22] Filed June 3, 1970
[45] Patented Jan. 11, 1972
[32] Priority June 9, 1969
[33] South Africa
[31] 69/4061

[54] STATIC INVERTER CIRCUITS
15 Claims, 4 Drawing Figs.

[52] U.S. Cl. .......... 321/45 R, 321/18
[51] Int. Cl. .......... H02m 7/48
[50] Field of Search .......... 321/45 R, 18

[56] References Cited

UNITED STATES PATENTS

| | | | |
|---|---|---|---|
| 3,435,324 | 3/1969 | Bishop .......... | 321/45 |
| 3,475,674 | 10/1969 | Porterfield et al. .......... | 321/45 |
| 3,538,342 | 11/1970 | Jensen et al. .......... | 321/45 X |

*Primary Examiner*—Gerald Goldberg
*Assistant Examiner*—John M. Gunther
*Attorney*—Sughrue, Rothwell, Mion, Zinn & Macpeak

ABSTRACT: A method of regulating the output voltage of a complementary impulse commutated inverter which incorporates two silicon controlled rectifiers and has a commutation circuit which is arranged such that when the one silicon controlled rectifier is nonconductive and the other silicon controlled rectifier is conductive, firing of the nonconductive silicon controlled rectifier with a short trigger pulse of duration less than the turnoff time of each of the two silicon controlled rectifiers turns off both silicon controlled rectifiers in succession. A series of substantially similar signals are applied alternately to the gate of the one and the other silicon controlled rectifier, each signal comprising a short trigger pulse of a duration less than the turnoff time of each of the silicon controlled rectifiers followed after an interval of time by a long control pulse of duration longer than the turnoff time of each of the silicon controlled rectifiers and proportional to the required amplitude of the output voltage of the inverter. The one silicon controlled rectifier is fired when it is nonconductive and the other silicon controlled rectifier is conductive by application of the short trigger pulse of a signal to the gate of the one silicon controlled rectifier, thereby to turn off both silicon controlled rectifiers in succession. The one silicon controlled rectifier is subsequently refired by application of the long control pulse of the signal. The duration of the long pulse is varied to regulate the output voltage of the inverter.

Also apparatus for carrying out the method comprising an inverter of the type stated, pulse-generating means operative to apply signals as specified alternately to the gate of the one and the other silicon controlled rectifier, and control means associated with the pulse-generating means and operative to vary the duration of the long control pulse of each signal.

INVENTOR

BERNHARD SIEGFRIED RUDERT

BY Sughrue, Rothwell, Mion, Zinn & Macpeak

ATTORNEYS

STATIC INVERTER CIRCUITS

This invention relates to static inverters.

According to the invention a method of regulating the output voltage of a complementary impulse commutated inverter incorporating two silicon controlled rectifiers and having a commutation circuit which is arranged such that when the one silicon controlled rectifier is nonconductive and the other silicon controlled rectifier is conductive, firing of the nonconductive silicon controlled rectifier with a short trigger pulse of duration less than the turnoff time of each of the two silicon controlled rectifiers turns off both silicon controlled rectifiers in succession, including the steps of applying a series of substantially similar signals alternately to the gate of the one and the other silicon controlled rectifier, each signal comprising a short trigger pulse of a duration less than the turn off time of each of the silicon controlled rectifiers followed after an interval of time by a long control pulse of a duration longer than the turnoff time of each of the silicon controlled rectifiers and proportional to the required amplitude of the output voltage of the inverter; firing the one silicon controlled rectifier when it is nonconductive and the other silicon controlled rectifier is conductive by application of the short trigger pulse of a signal to the gate of the one silicon controlled rectifier, thereby to turn off both silicon controlled rectifiers in succession; subsequently refiring the one silicon controlled rectifier by application of the long control pulse of the signal; and varying the duration of the long control pulse.

For the purpose of this specification, the term "silicon controlled rectifiers" is used to signify any semiconductive switching device, such as a thyristor, triac, thyratron or the like.

It will be appreciated that the duration of a long control pulse determines the amplitude of the output voltage of the inverter.

The time interval between the commencement of the short triggering pulse and the termination of the long control pulse may be fixed and is preferably substantially equal to the duration of half an operating cycle of the inverter. Thus, the time interval between the short trigger pulse and the long control pulse may be used to regulate the pulse width of the output voltage of the inverter.

A tuned circuit having a resonant frequency in the order of, or higher than the second harmonic of the operating frequency of the inverter may be provided, the resonant frequency of the tuned circuit controlling the range of variation of the inverter output voltage. The range over which the output voltage may be varied decreases with an increase in the resonant frequency.

Alternatively, during the interval of time between the application of the short trigger pulse and the long control pulse of a signal to the gate of the silicon controlled rectifier, at least one regulating pulse may be applied to the gate of the other silicon controlled rectifier thereby to regulate the duration of the long control pulse and thus to regulate the pulse width of the output voltage. At least one regulating pulse may also be applied to the gate of the one silicon controlled rectifier during the same interval.

The last pulse of a series of signals applied to the gates of the thyristors of the inverter may be a short pulse applied to the gate of the silicon controlled rectifier which is nonconductive at that time, such short pulse acting to turn off both silicon controlled rectifiers and terminate operation of the inverter.

The output current of the inverter may be limited to a predetermined value to permit commutation under widely varying load conditions.

According to another aspect of the invention complementary impulse commutated inverter apparatus includes a pair of silicon controlled rectifiers; a commutation circuit; a center-tapped transformer connected to the commutation circuit; the commutation circuit being arranged such that when the one silicon controlled rectifier is nonconductive and the other silicon controlled rectifier is conductive, firing of the nonconductive silicon controlled rectifier with a short pulse of duration less than the turnoff time of each silicon controlled rectifier, causes both silicon controlled rectifiers to be turned off in succession; pulse-generating means connected to the gates of the two silicon controlled rectifiers, the pulse-generating means being operative to apply a series of signals alternately to the gate of the one and the other silicon controlled rectifier, each signal comprising a short trigger pulse of a duration shorter than the turnoff time of each silicon controlled rectifier followed after an interval of time by a long control pulse of a duration longer than the turnoff time of each silicon controlled rectifier and proportional to the required amplitude of the output voltage of the inverter; and control means associated with the pulse-generating means and operative to vary the duration of the long controlled pulse of each signal.

For the purposes of this specification, the term "center-tapped transformer" also includes a center-tapped choke.

The pulse-generating apparatus may be adapted always to terminate a series of signals with a short pulse, operative to turn off both silicon controlled rectifiers and terminate operation of the inverter.

The pulse-generating means may also be operative to apply, during the interval of time between the application of the short trigger pulse and the long control pulse of a signal to the gate of the one silicon controlled rectifier, at least one regulating pulse to the gate of the other silicon controlled rectifier. The pulse-generating means may further be operative to apply at least one regulating pulse to the gate of the one silicon controlled rectifier during the same interval.

The apparatus may include a commutation capacitor connected across the center-tapped transformer; and a filter choke connected to the center-tapped transformer, the commutation capacitor and the filter choke forming a tuned circuit having a resonant frequency in the order of or greater than the second harmonic of the operating frequency of the inverter, depending on the required output voltage control range.

The inverter apparatus may include output current-limiting means.

A series tuned filter circuit may be connected to the center-tapped transformer and the output current-limiting means may comprise current-sensitive means adapted to alter the effective Q value of the tuned filter circuit to increase the losses in the filter circuit such that the maximum output current does not exceed a predetermined value.

Preferred embodiments of the invention will now be described by way of example with reference to the accompanying drawings in which.

Figure 1:
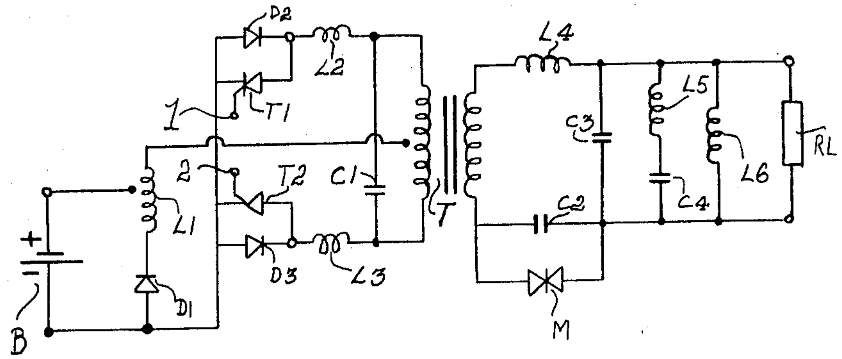
FIG. 1 is a circuit diagram of a complementary impulse commutated inverter according to the invention adapted to apply a substantially constant voltage AC output to a load from a DC source of supply.

Referring first to FIG. 1, the basic inverter circuit consists of the main switching thyristors T1 and T2, the free wheeling diodes D2 and D3, the commutation circuit consisting of elements L1, L2, L3, C1 and D1 and the primary winding of center-tapped transformer T. The inverter is followed by a standard filter circuit consisting of elements L4, L5, L6, C2, C3 and C4, with the symmetrical voltage clipper M connected across the capacitor C2 to limit the maximum possible load current and thus the maximum safe turnoff current of T1 and T2 at the instant of commutation.

Figure 2:
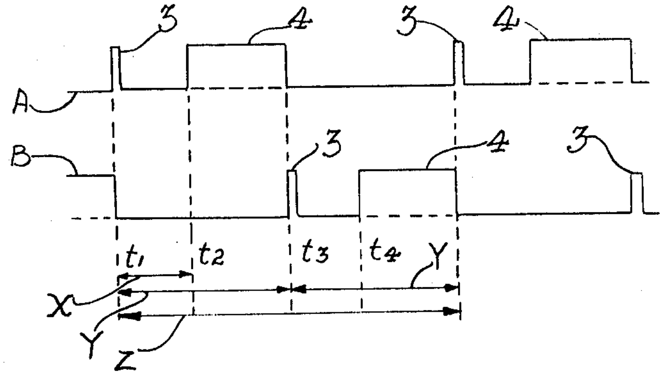
FIG. 2 is a pulse diagram of one form of the signal train which is applicable to the gates of the thyristors of the inverter of FIG. 1.
Figure 3:
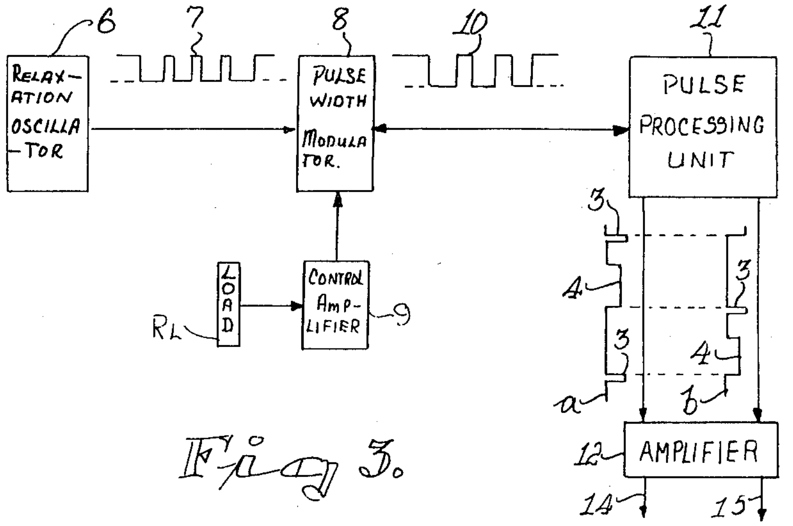
FIG. 3 is a block diagram of pulse-generating means suitable for applying the signal train of FIG. 2 to the gates of the thyristors of the inverter of FIG. 1.

The pulse-generating means of FIG. 3 is connected to gates 1, 2 of thyristors T1, T2 respectively to apply the signal trains A, B of FIG. 2 to gates 1 and 2 respectively. The signal trains comprise two series of similar signals which are displaced in time so that the signals are applied alternately to the gate of the one and the other thyristor. Each signal comprises a short trigger pulse 3 of a duration shorter than the turnoff time of each thyristor followed after an interval of time by a long control pulse 4 of a duration longer than the turnoff time of each thyristor and proportional to the required amplitude of the output voltage of the inverters.

The time interval Z between the commencement of the short trigger pulses 3 of successive signals of a signal train equals the duration of one operating cycle of the inverter and is therefore dependent on the operating frequency. The time interval Y between the commencement of the short trigger pulse 3 and the termination of the long control pulse 4 of a signal equals the duration of half an operating cycle of the inverter. By varying the time interval X between the trigger pulse 3 and the control pulse 4, the duration of long control pulse 4 can be varied.

Assume that at a certain instant $t_1$, the thyristor T1 is nonconductive and thyristor T2 is conducting. If now T1 is fired at time $t_1$ by means of a trigger pulse 3 shorter than the turnoff time of each thyristor, then T2 is turned off because of the oscillatory current flowing through L2, C1 and L3. During commutation both T1 and D3 are conducting and hence the center tap of transformer T can for all practical purposes be considered to be at ground potential during this period. The inductance values of L2 and L3 being equal, the inductance L1 absorbs energy during this period which is restored to the battery B via D1 after T2 is turned off. Because of the clipping action of D1, elements L2 and C1 continue the oscillatory action and consequently T1 is also turned off.

Commutation capacitor C1 and filter inductance L4 constitute an additional tuned circuit and after both T1 and T2 are turned off, C1 commences an oscillatory action with L4. The resonant frequency of these two elements is preferably chosen to be two or three times the nominal operating frequency of the inverter in order to ensure a reasonable voltage control range. At the instant $t_2$, T1 is fired again, but this time with a long control pulse 4 so that T1 will remain on until T2 is fired again. The interval Z between the successive short pulses 3 remains constant and is determined by the nominal frequency of the inverter. The time interval X is altered depending upon the required output voltage. If $t_2$ follows shortly after $t_1$ then the inverter will deliver a large output voltage. A small output voltage is obtained if $t_2$ is delayed for a considerable fraction of the half cycle period Y. If the last pulse in the pulse train supplied to the gates of the thyristors is always a short trigger pulse 3, the inverter turns itself off and therefore a contactor between the battery B and the inverter becomes superfluous.

The symmetrical voltage clipper M comprises a pair of Zener diodes which limits the output current of the inverter to a safe value and which operates as follows: the capacitor C2 and the inductance L4 are tuned to resonate at the nominal operating frequency of the inverter. The voltage across C2 is directly proportional to the load current and its peak value reaches the clipping voltage of M at a current well above the full load current. A further increase in the load current reduces the effective Q of the tuned circuit L4, C2 because of voltage clipping and thus the maximum output current of the inverter is limited. Because L4 and C2 form the series tuned branch of the filter linking the load to the inverter the maximum possible commutation current is also limited.

Considering now FIG. 3, the pulse-generating means comprises relaxation oscillator 6 which produces a pulse train 7 which is applied to pulse width modulator 8. Pulse width modulator 8 changes the pulse width of pulse train 7 by means of a control voltage or control current received from control amplifier 9 which, in turn, obtains its information from the output voltage of the inverter circuit of FIG. 1 appearing across load RL. Thus, the pulse width is varied automatically to maintain a substantially constant output voltage across load RL.

The modulated pulse output 10 from modulator 8 is applied to pulse-processing unit 11 which basically comprises a flip-flop circuit and an additional circuit which produces a short pulse at each rising edge of pulse train 10. Proper addition of pulses produces a pair of signal trains, *a*, *b* which, after amplification in amplifier 12, comprises the pulse trains A, B of FIG. 2 which are applied via leads 14, 15 to gates 1,2 respectively of thyristors T1, T2 of the inverter of FIG. 1.

By appropriately locking of the oscillator 6 with the pulse-processing unit 11, the oscillator 6 always stops at the end of a half cycle. The short triggering pulses 3 being produced by the rising edge of the output pulses 10 of the pulse width modulator 8 and by arranging for the output voltage always to be positive when the inverter is in the off position, the last pulse of a pulse train will always be a short pulse. Pulse-processing unit 11 can also be locked to oscillator 6 in such a way that the inverter always turns off on the same thyristor and when turned on always starts with the other thyristor.

Figure 4:
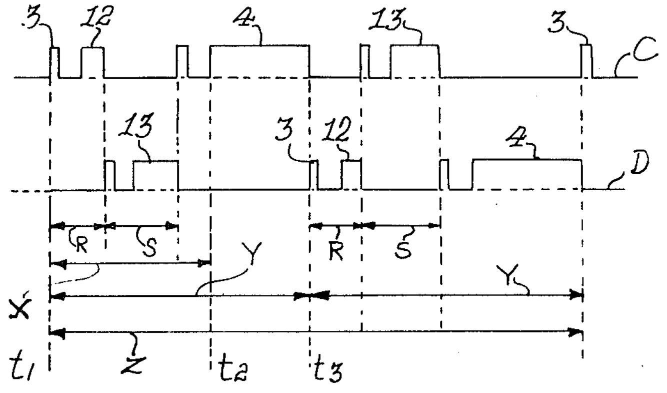
FIG. 4 is a pulse diagram of another form of signal train which is applicable to the gates of the thyristors of the inverter of FIG. 1.

The alternative signal trains C, D of FIG. 4 can also be produced by means of pulse-generating means similar to that described above with reference to FIG. 3, with the exception that pulse width modulator 8 is adapted to produce a sequence of three short pulses per half cycle which have durations longer than the turn off time of the thyristors. The spacing of these pulses, which operate the flip-flop in the pulse-processing unit 11, is changed in accordance with the required output voltage of the inverter.

As can be seen from FIG. 4, during the period X in the interval of time between the application of the trigger pulse 3 and the control pulse 4 of each signal in signal train C to the gate 1 of thyristor T1, a regulating pulse 13 in signal train D is applied to the gate 2 of thyristor T2. During the same interval of time, a regulating pulse 12 in signal train C is applied to the gate 1 of thyristor T1. During the interval of time between the application of the trigger pulse 3 and the control pulse 4 of each signal train D to gate 2 of thyristor T2, regulating pulses 12 and 13 are applied in reversed fashion.

The interval Y is fixed as before and is dependent on the operating frequency of the inverter. By varying the time interval S, the output voltage of the inverter is changed. The time interval R can be changed with interval S but preferably at a different rate. This has the effect of giving additional range of voltage control. Also by changing the time intervals R and S at different rates, the harmonic content of the output wave form is reduced.

Pulse generation is well known in the art and the operation of the pulse-generating means of FIG. 3 to produce the signal trains of FIGS. 2 and 4 will be clear to a man skilled in the art.

It will be appreciated that many variations in detail are possible without departing from the scope of the appended claims. For example, instead of using a Zener diode voltage clipper M as described above, the voltage clipper may comprise a center-tapped transformer with two rectifier diodes feeding energy back to the battery.

With the invention, inverter circuits can be simplified and the reliability of operation under widely varying load conditions can be improved.

I claim:

1. A method of regulating the output voltage of a complementary impulse commutated inverter incorporating two silicon controlled rectifiers and having a commutation circuit which is arranged such that when the one silicon controlled rectifier is nonconductive and the other silicon controlled rectifier is conductive, firing of the nonconductive silicon controlled rectifier with a short trigger pulse of duration less than the turnoff time of each of the two silicon controlled rectifiers turns off both silicon controlled rectifiers in succession, includes the steps of applying a series of substantially similar signals alternately to the gate of the one and the other silicon controlled rectifier, each signal comprising a short trigger pulse of a duration less then the turnoff time of each of the silicon controlled rectifiers followed after an interval of time by a long control pulse of a duration longer than the turnoff time of each of the silicon controlled rectifiers and proportional to the required amplitude of the output voltage of the inverter; firing the one silicon controlled rectifier when it is nonconductive and the other silicon controlled rectifier is conductive by application of the short trigger pulse of a signal to the one gate of the one silicon controlled rectifier, thereby to turn off both silicon controlled rectifiers in succession; subsequently refiring the one silicon controlled rectifier by application of the long control pulse of the signal; and varying the duration of the long control pulse.

2. A method as claimed in claim 1, wherein the time interval between the commencement of the short triggering pulse and the termination of the long control pulse is fixed.

3. A method as claimed in claim 1, including the step of providing a tuned circuit having a resonant frequency in the order of or higher than the second harmonic of the operating frequency of the inverter, the resonant frequency of the tuned circuit controlling the range of variation of the inverter output voltage.

4. A method as claimed in claim 1, wherein during the interval of time between the application of the short trigger pulse and the long control pulse of a signal to the gate of the one silicon controlled rectifier, at least one regulating pulse is applied to the gate of the other silicon controlled rectifier.

5. A method as claimed in claim 1, wherein the last pulse of a series of signals applied to the gates of the thyristors of the inverter is a short pulse applied to the gate of the silicon controlled rectifier which is nonconductive at that time, such short pulse acting to turn off both silicon controlled rectifiers and terminate operation of the inverter.

6. A method as claimed in claim 1, wherein the output current of the inverter is limited to a predetermined value.

7. A method as claimed in claim 2, wherein the time interval between the commencement of the short triggering pulse and termination of the long control pulse is substantially equal to the duration of half an operating cycle of the inverter.

8. A method as claimed in claim 4, wherein at least one regulating pulse is also applied to the gate of the one silicon controlled rectifier during such interval of time.

9. Complementary impulse commutated inverter apparatus including a pair of silicon controlled rectifiers; a commutation circuit; a center-tapped transformer connected to the commutation circuit; the commutation circuit being arranged such that when the one silicon controlled rectifier is nonconductive and the other silicon controlled rectifier is conductive, firing of the nonconductive silicon controlled rectifier with a short pulse of duration less than the turnoff time of each silicon controlled rectifier, causes both silicon controlled rectifiers to be tuned off in succession; pulse-generating means connected to the gates of the two silicon controlled rectifiers, the pulse-generating means being operative to apply a series of signals alternately to the gate of the one and the other silicon controlled rectifier, each signal comprising a short triggering pulse of a duration shorter than the turnoff time of each silicon controlled rectifier followed after an interval of time by a long controlled pulse of a duration longer than the turnoff time of each silicon controlled rectifier and proportional to the required amplitude of the output voltage of the inverter; and control means associated with the pulse-generating means and operative to vary the duration of the long control pulse of each signal.

10. Inverter apparatus as claimed in claim 9, wherein the pulse-generating means is adapted always to terminate a series of signals with a short pulse, operative to turn off both silicon controlled rectifiers and terminate operation of the inverter.

11. Inverter apparatus as claimed in claim 9, wherein the pulse-generating means is operative to apply, during the interval of time between the application of the short trigger pulse and the long control pulse of a signal to the gate of the one silicon controlled rectifier, at least one regulating pulse to the gate of the other silicon controlled rectifier.

12. Inverter apparatus as claimed in claim 9, including a commutation capacitor connected across the center-tapped transformer, and a filter choke connected to the center-tapped transformer, the commutation capacitor and the filter choke forming a tuned circuit having a resonant frequency in the order of, or greater than, the second harmonic of the operating frequency of the inverter.

13. Inverter apparatus as claimed in claim 9, including output current limiting means.

14. Inverter apparatus as claimed in claim 11 wherein the pulse generator is operative also to apply at least one regulating pulse to the gate of the one silicon controlled rectifier during such interval of time.

15. Inverter apparatus as claimed in claim 13, wherein a series tuned filter circuit is connected to the center-tapped transformer; and the output current-limiting means comprises current-sensitive means adapted to alter the effective Q value of the tuned filter circuit to increase the losses in the filter circuit such that the maximum output current does not exceed a predetermined value.

* * * * *